US008375983B2

(12) United States Patent
Niebel (10) Patent No.: US 8,375,983 B2
(45) Date of Patent: Feb. 19, 2013

(54) MULTI-STAGE FLUID REGULATORS

(75) Inventor: Ruediger Niebel, Limburgerhof (DE)

(73) Assignee: Tescom Corporation, Elk River, MN (US)

( * ) Notice: Subject to any disclaimer, the term of this patent is extended or adjusted under 35 U.S.C. 154(b) by 1012 days.

(21) Appl. No.: 12/371,194

(22) Filed: Feb. 13, 2009

(65) Prior Publication Data

US 2010/0206401 A1  Aug. 19, 2010

(51) Int. Cl.
 *F16K 31/36* (2006.01)
(52) U.S. Cl. ............... 137/503; 137/505.12; 137/505.13
(58) Field of Classification Search .................. 137/500, 137/503, 506, 509, 505.12, 505.13, 505.39, 137/505.42, 613
See application file for complete search history.

(56) References Cited

U.S. PATENT DOCUMENTS

| 910,292 | A | * | 1/1909 | Krichbaum | 137/509 |
|---|---|---|---|---|---|
| 1,891,547 | A | * | 12/1932 | Krichbaum | 137/505.13 |
| 2,963,040 | A | * | 12/1960 | Zimmer | 137/505.42 |
| 3,083,721 | A | * | 4/1963 | Matthews et al. | 137/505.12 |
| 4,732,190 | A | * | 3/1988 | Polselli | 137/503 |
| 5,465,750 | A | | 11/1995 | Wang | |
| 5,996,617 | A | | 12/1999 | Olds et al. | |
| 6,026,849 | A | | 2/2000 | Thordarson | |
| 2009/0071548 | A1 | | 3/2009 | Patterson et al. | |

FOREIGN PATENT DOCUMENTS

FR  1164864  10/1958

OTHER PUBLICATIONS

International Searching Authority, "International Search Report," issued in connection with international application serial No. PCT/IB2010/000464, mailed Oct. 7, 2011, 4 pages.
International Searching Authority, "Written Opinion of the International Searching Authority," issued in connection with international application serial No. PCT/IB2010/000464, mailed Oct. 7, 2011, 4 pages.
International Bureau, "International Preliminary Report on Patentability," issued in connection with international application serial No. PCT/IB2010/000464, mailed Oct. 27, 2011, 6 pages.
Emerson Process Management, "R332 Series Integral Two-Stage Regulators," Product Bulletin, 1 page.
Emerson Process Management, "Type R332 Integral Two-Stage Regulator," published Dec. 2000, 6 pages.
Emerson Process Management, "Type 54-2100 Series High Pressure Regulator," TESCOM Industrial Controls, published May 2007, 2 pages.

(Continued)

*Primary Examiner* — Eric Keasel
(74) *Attorney, Agent, or Firm* — Hanley, Flight & Zimmerman, LLC (57) ABSTRACT

Multi-stage fluid regulators are described. An example fluid regulator includes a regulator body having an inlet in fluid communication with a source of pressurized fluid. A first fluid valve is disposed within the regulator body and coupled to the inlet to regulate a pressure of the pressurized fluid at the inlet. A second fluid valve is disposed within the regulator body and coupled to the inlet and, via a passageway, to the first fluid valve. The second fluid valve is to cause a fluid pressure in the passageway to be regulated to a predetermined portion of the pressure of the pressurized fluid at the inlet.

25 Claims, 4 Drawing Sheets

OTHER PUBLICATIONS

Emerson Process Management, "Type 26-1700 Series High Pressure/Back Pressure Regulators," TESCOM Industrial Controls, published Mar. 2007, 2 pages.

Emerson Process Management, "Type 54-2300 Series Hydraulic/Back Pressure/High Flow Regulators," TESCOM Industrial Controls, published May 2007, 2 pages.

Emerson Process Management, "Type R632 Integral Two-Stage Regulator," Product Bulletin LP-7, published Jan. 2004, 2 pages.

Emerson Process Management, "R600 and HSRL Series Regulators," Instruction Manual, published Jul. 2004, 8 pages.

* cited by examiner

MULTI-STAGE FLUID REGULATORS

FIELD OF THE DISCLOSURE

The present disclose relates generally to fluid regulators and, more particularly, to multi-stage fluid regulators.

BACKGROUND

Process control systems commonly employ pressure regulators (e.g., back-pressure regulators) to control or maintain the pressure of a pressurized fluid such as, for example, air, hydraulic fluid, etc. at or below a certain pressure. Maintaining or controlling a pressure of the process fluid may serve to protect instruments or other control devices that are sensitive to and which may be damaged by high pressures. For example, a back-pressure fluid regulator typically regulates a pressure of a high pressure fluid source to prevent high pressure fluid from reaching instruments or control devices upstream from the back-pressure regulator. A back-pressure regulator is typically configured to relieve or reduce excess fluid pressure when a pressure of a pressurized fluid increases to a pressure greater than a desired operating pressure suitable for use by the various instruments or control devices receiving the pressurized fluid.

Fluid regulators such as, for example, back-pressure regulators typically include a fluid valve assembly having a pressure sensor such as a piston to sense the pressure of a pressurized fluid at an inlet of the regulator. When the pressure of the pressurized fluid at the inlet exceeds a reference or set-point pressure (e.g., provided by the fluid regulator), the pressure sensor causes a flow control member of the fluid valve to open to allow fluid flow through the regulator body between the inlet and an outlet, which may be coupled to a low pressure system utilizing the fluid or to the atmosphere.

However, back-pressure regulators employed in high pressure fluid systems are often subjected to a relatively high pressure differential across the regulator (e.g., between an inlet and an outlet). In particular, when used in high pressure hydraulic applications, the valve assembly of a back-pressure fluid regulator may be subjected to a pressure differential of, for example, 10,000 psi. Such a high pressure differential results in high fluid flow rates across the fluid valve assembly, thereby causing components such as a valve plug, a valve seat, etc. of the fluid valve assembly to become damaged due to, for example, erosion. Undesired leakage may occur as a result of such erosion, thereby reducing the useful life of the back-pressure regulator, increasing maintenance, system downtimes, and/or costs.

SUMMARY

An example fluid regulator described herein includes a regulator body having an inlet in fluid communication with a source of pressurized fluid. A first fluid valve is disposed within the regulator body and coupled to the inlet to regulate a pressure of the pressurized fluid at the inlet. A second fluid valve is disposed within the regulator body and coupled to the inlet and, via a passageway, to the first fluid valve. The second fluid valve is to cause a fluid pressure in the passageway to be regulated to a predetermined portion of the pressure of the pressurized fluid at the inlet.

In another example, a fluid regulator includes a regulator body having a first inlet to be in fluid communication with a source of pressurized fluid. A first fluid valve is disposed in the regulator body and has a second inlet and a first outlet, where the second inlet is fluidly coupled to the first inlet. The first valve increases a flow of the pressurized fluid from the second inlet to the first outlet to decrease a pressure of the pressurized fluid when the pressure of the pressurized fluid at the inlet exceeds a pre-set pressure. A second fluid valve is disposed in the regulator body and has a third inlet and a second outlet, where the third inlet is coupled to the first outlet. The second valve is fluidly coupled to the first inlet to cause the second valve to regulate a fluid pressure at the first outlet and the third inlet based on the pressure of the pressurized fluid at the first inlet.

In yet another example, a fluid regulator includes first means for regulating a pressure of a pressurized fluid at an inlet of the regulator. The first means for regulating is to cause fluid flow through a first passageway of the regulator when the pressure of the pressurized fluid at the inlet exceeds a pre-set pressure. The fluid regulator also includes second means for regulating the pressure of fluid flow through a second passageway between the first means for regulating and an outlet of the regulator. The second means for regulating is to regulate the pressure of the fluid in the second passageway to a predetermined portion of the pressurized fluid at the inlet.

DETAILED DESCRIPTION

The example fluid regulators described herein provide a stepped or inter-stage pressure reduction between an inlet and an outlet of the regulator. This is particularly advantageous for use with process systems using relatively high pressure fluids such as systems using hydraulic oil.

In general, the example fluid regulators described herein regulate the pressure of a pressurized fluid at an inlet of the regulator. An example fluid regulator (e.g., a back-pressure regulator) described herein includes a first fluid valve to provide a first-stage pressure reduction and a second fluid valve to provide a second-stage pressure reduction. More specifically, the second fluid valve provides a predetermined inter-stage pressure reduction. In this manner, each of the first fluid valve and the second fluid valve is only subjected to a portion of a total pressure differential across the regulator between an inlet and an outlet of the regulator. As a result, each of the first and second fluid valves is exposed to a substantially smaller or lower pressure differential and thus, substantially lower fluid flow rates than would otherwise be experienced by a single fluid valve subjected to the total pressure differential. Substantially reducing the pressure differentials and fluid flow rates experienced by the first and second fluid valves substantially minimizes or prevents damage (e.g., erosion) to the components of the first and second fluid valves. Therefore, the example fluid regulators described herein require substantially less maintenance, system downtime, inventory and, thus, costs.

Additionally, to provide a predetermined inter-stage pressure reduction, a first surface area of the second fluid valve and a second surface area of the second fluid valve are sized and/or shaped to provide a predetermined or fixed loading ratio. In this manner, a pressure differential across the second fluid valve enables the second fluid valve to control fluid flow to the outlet of the regulator until the pressure of the fluid between the first fluid valve (i.e., the inter-stage pressure) and the second fluid valve is reduced to a fraction of the regulator inlet pressure. In one example, such a fixed loading ratio reduces the pressure drop across the first fluid valve (i.e., the pressure difference between the regulator inlet and the inter-stage pressure) to about fifty percent (50%) of the inlet pressure. However, in other examples, the predetermined or fixed loading ratio may provide any other suitable or desired pressure drop.

Figure 1:
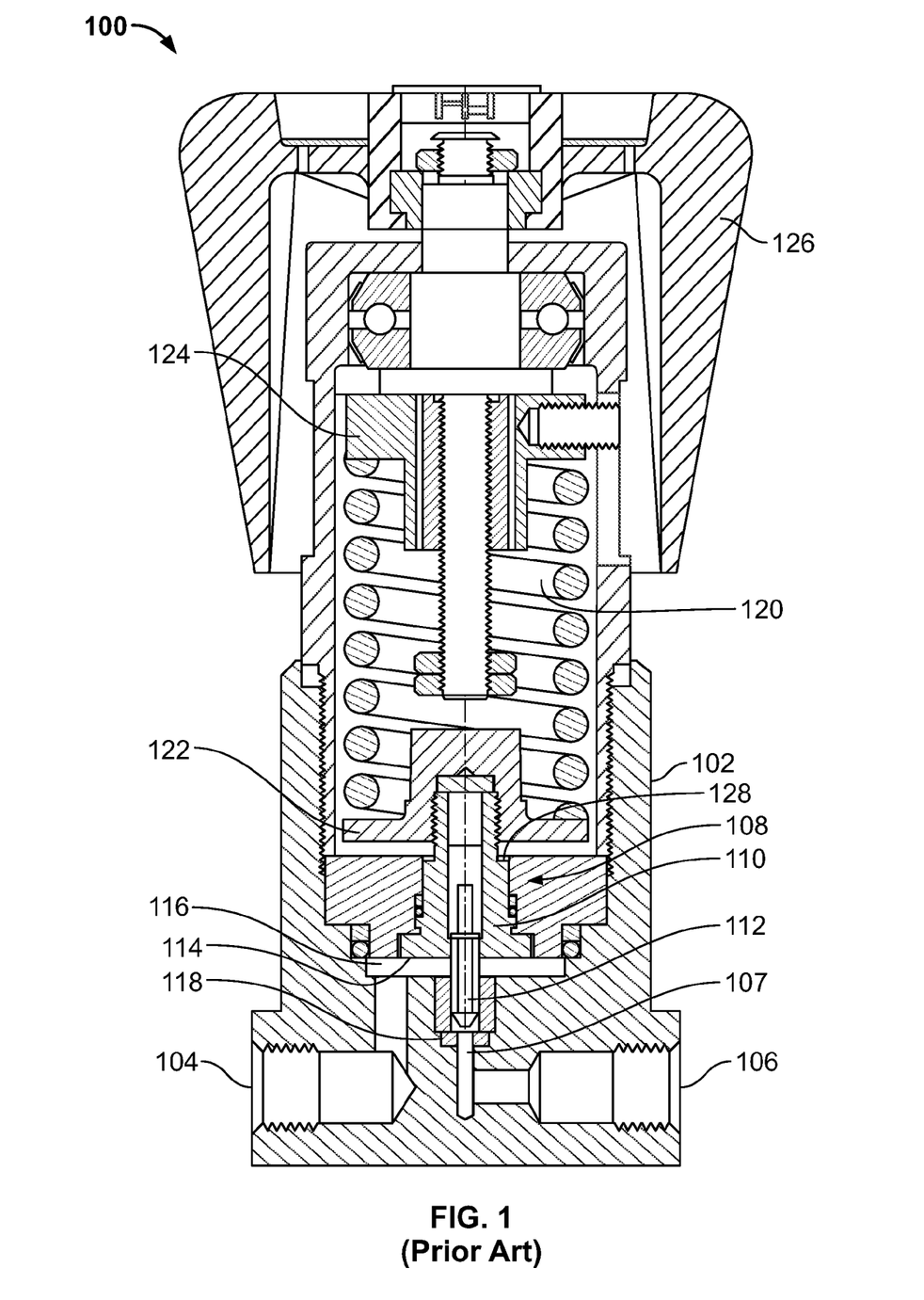
FIG. 1 is cross-sectional view of a known fluid regulator.

Before describing the example fluid regulators in greater detail, a brief discussion of a known fluid regulator 100 is provided in connection with FIG. 1. The regulator 100 includes a body 102 having an inlet 104 fluidly coupled to an outlet 106 via a passageway 107. A valve assembly 108 is disposed within the regulator body 102 to regulate the pressure of a pressurized fluid at the inlet 104. The valve assembly 108 includes a sensing piston 110 operatively coupled to a flow control member 112 (e.g., a valve plug) and disposed within the body 102. A first side 114 of the sensing piston 110 and the regulator body 102 define a sensing chamber 116. The sensing piston 110 moves the flow control member 112 relative to a valve seat 118 to control or regulate the pressure of a pressurized process fluid at the inlet 104. More specifically, the sensing piston 110 moves the flow control member 112 to an open position (e.g., away from the valve seat 118) to allow fluid flow through the regulator body 102 when the pressure of the pressurized fluid at the inlet 104 exceeds a pre-set load or predetermined pressure.

A closing spring 120 provides the pre-set load or force and is disposed within the regulator body 102 between a fixed spring seat 122 and an adjustable spring seat 124. The closing spring 120 is operatively coupled to the sensing piston 110 via the fixed spring seat 122 to bias the sensing piston 110 and, thus, the flow control member 112 toward the valve seat 118 to prevent fluid flow between the inlet 104 and the outlet 106 (e.g., a closed position). The amount of force exerted by the closing spring 120 can be adjusted (e.g., increased or decreased) via the adjustable spring seat 124. For example, a control knob 126 is operatively coupled to the adjustable spring seat 124 such that turning the control knob 126 in a first direction (e.g., clockwise) causes the closing spring 120 to exert a greater force on a second side 128 of the sensing piston 110, and turning the control knob 126 in a second direction (e.g., counterclockwise) causes the closing spring 120 to reduce the amount of force exerted on the second side 128 of the sensing piston 110. Increasing the force exerted by the closing spring 120 on the second side 128 of the sensing piston 110 requires a higher or greater force to be exerted on the first side 114 of the sensing piston 110 by the pressure of the pressurized fluid at the inlet 104 to move the flow control member 112 away from the valve seat 118 to allow fluid flow between the inlet 104 and the outlet 106.

In operation, the inlet 104 receives pressurized fluid from, for example, a pressurized fluid source. The sensing piston 110 senses the pressure of the pressurized fluid at the inlet 104 via the sensing chamber 116. When the pressure of the pressurized fluid at the inlet 104 exerts a force on the first side 114 of the sensing piston 110 that is greater than the force exerted on the second side 128 of the sensing piston 110 by the closing spring 120, the sensing piston 110 causes the flow control member 112 to move away from the valve seat 118 to allow fluid flow between the inlet 104 and the outlet 106. The sensing piston 110 causes the flow control member 112 to move toward the valve seat 118 when the pressure of the pressurized fluid at the inlet 104 is substantially equal to or less than the pre-set load or predetermined pressure provided by the closing spring 120. Thus, the flow control member 112 moves toward the valve seat 118 to prevent fluid flow between the inlet 104 and the outlet 106 when the pressure of the pressurized fluid at the inlet 104 exerts a force on the first side 114 of the sensing piston 110 that is less than or substantially equal to the force exerted on the first side 126 of the sensing piston 110 by the closing spring 118.

The outlet 106 may be fluidly coupled to a low pressure system or the atmosphere. Thus, in high pressure applications, the regulator 100 may be subjected to a high pressure differential across the valve assembly 108 and/or the regulator body 102 as the high pressure fluid at the inlet 104 is reduced to a low pressure fluid at the outlet 106. For example, in some applications (e.g., hydraulic applications), the regulator 100 may experience pressure differentials exceeding 10,000 psi.

Such high pressure differentials cause high fluid flow rates through the regulator 100 between the inlet 104 and the outlet 106. Such high fluid flow rates may cause damage (e.g., erosion effects, wash-out, etc.) to the sensing piston 110, the flow control member 112, the valve seat 118, and/or the regulator body 102. More specifically, for example, the sensing piston 110, the flow control member 112, and/or the valve seat 118 may erode or crack, causing unwanted leakage between the inlet 104 and the outlet 106. In other examples, the high fluid flow rates may damage or cause to the regulator body 102 to erode (e.g., causing cracks within a cavity of the regulator body), resulting in undesired external leakage. As a result, when used to regulate fluids having high pressure differentials, the useful life of the regulator 100 may be substantially reduced, thereby increasing maintenance, system downtime, and/or costs.

An insert is sometimes coupled to a flow control member and/or a valve stem to prevent damage (e.g., protect against erosion effects) to a regulator body or a valve assembly (e.g., a flow control member, a valve stem, and/or a valve seat) caused by high pressure differentials across the regulator 100. However, these inserts may not effectively or sufficiently prevent or protect against erosion effects to a fluid valve assembly.

Additionally or alternatively, a first fluid regulator may be fluidly coupled in series with a second fluid regulator. In this configuration, the first regulator has an inlet fluidly coupled to a high pressure fluid source and an outlet fluidly coupled to an inlet of the second fluid regulator. An outlet of the second fluid regulator is then fluidly coupled to a low pressure system or to the atmosphere. In this manner, the first regulator reduces the pressure of the high pressure fluid at its inlet to an intermediate pressure at its outlet. The inlet of the second regulator then receives the fluid at the intermediate pressure, thereby reducing the pressure of the fluid across the first and second regulators to a substantially lower pressure. Although such a series coupled configuration may be effective, such a configuration is expensive and requires at least two separate fluid regulators, resulting in more maintenance and costs. Additionally, such a series configuration requires a reference pressure of the second fluid regulator to be adjusted to match a reference pressure of the first fluid regulator. As a result, such a configuration is more complex and may not allow for a convenient or desired reference pressure or pre-load setting.

Figure 2A:
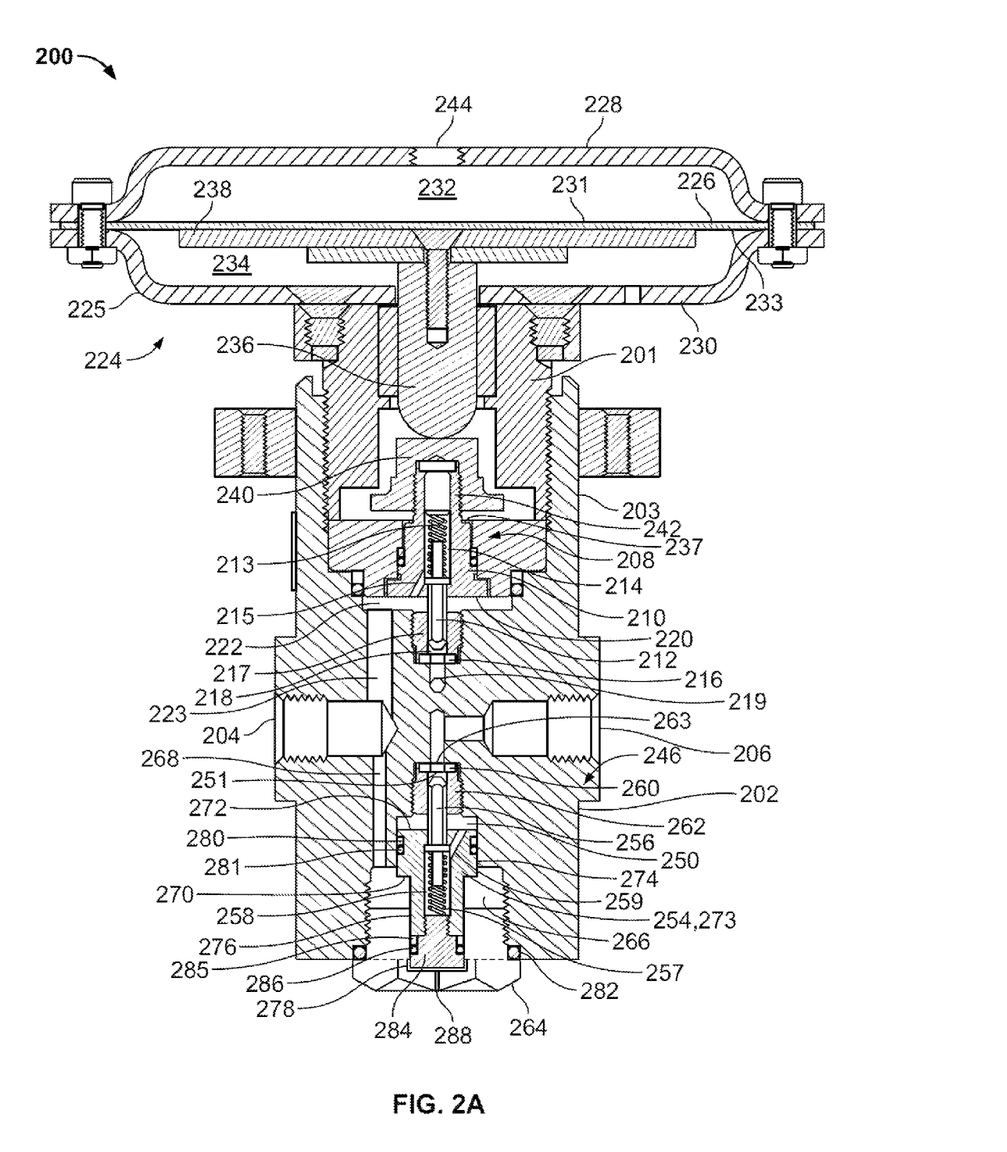
FIG. 2A illustrates an example fluid regulator described herein.

FIG. 2A illustrates an example fluid regulator 200. The example fluid regulator 200 substantially minimizes or prevents erosion effects caused by high pressure differentials and/or high fluid flow rates across or through the regulator 200. The example fluid regulator 200 may be used to, for example, maintain a control pressure of a re-circulating pressure system, relieve excess system pressures to protect pressure sensitive devices (e.g., upstream of the pressure system), etc. In other examples, the example regulator 200 may be used as, for example, a venting mechanism when precise or controlled venting of a pressurized fluid system is required.

The example regulator 200 shown in FIG. 2A regulates the pressure of a pressurized fluid. The example regulator 200 includes a regulator body 202 having an upper body portion 201 coupled (e.g., threadably coupled) to a lower body portion 203 to form a fluid flow path between an inlet 204 and an outlet 206 of the regulator 200. A first fluid valve 208 is disposed within the regulator body 202 between the upper body portion 201 and the lower body portion 203. The first fluid valve 208 includes a first pressure sensor 210 operatively coupled to a first flow control member 212 (e.g., a poppet or valve plug). The first flow control member 212 is coupled to the first pressure sensor 210 via a spring 213 and is at least partially disposed within a cavity 214 of the first pressure sensor 210. The spring 213 provides precise control of the first flow control member 212 and/or prevents the first flow control member 212 from forcibly engaging a valve seat 216. In this example, the first pressure sensor 210 includes a passage 215 to pressure balance the first flow control member 212. However, in other examples, the first flow control member 212 may be unbalanced. The valve seat 216 is coupled to the regulator body 202 via a retainer 217 and defines an inlet 218 and an outlet 219 of the first fluid valve 208.

A first side 220 of the first pressure sensor 210, the inlet 204, and the regulator body 202 define a sensing chamber 222. The sensing chamber 222 receives pressurized fluid from the inlet 204 via a first inlet path or passageway 223. When the pressure of the pressurized fluid at the inlet 204 exceeds a reference or pre-set pressure, the first pressure sensor 210 causes the first flow control member 212 to move away from the valve seat 216 to allow fluid flow between the inlet 204 and the outlet 219 of the first fluid valve 208 (e.g., an open position). When the pressure of the pressurized fluid at the inlet 204 is less than a reference pressure, the first pressure sensor 210 causes the first flow control member 212 to engage the valve seat 216 to prevent fluid flow between the inlet 204 and the outlet 219 of the first fluid valve 208 (e.g., a closed position).

The example regulator 200 includes a loading mechanism 224 to provide a reference or pre-set pressure. In this example, the loading mechanism 224 comprises an actuator 225 (e.g., a pneumatic actuator). A diaphragm 226 is captured between an upper casing 228 and a lower casing 230 of the actuator 225. The upper casing 228 and a first side 231 of the diaphragm 226 define a first chamber 232 and the lower casing 230 and a second side 233 of the diaphragm 226 defines a second chamber 234. An actuator stem 236 is coupled to the diaphragm 226 via a diaphragm plate 238 to operatively couple the diaphragm 226 and the first pressure sensor 210. In this example, the actuator stem 236 engages a coupling member 240 threadably coupled to an end 242 of the first pressure sensor 210 to provide a loading or reference pressure.

To adjust the reference pressure, a control fluid is supplied to the first chamber 232 via an inlet port 244 to move the diaphragm 226 and, thus, the actuator stem 236 toward the first pressure sensor 210 (e.g., in a downward direction in the orientation of FIG. 2A). The actuator stem 236, in turn, exerts a force on a second side 237 of the first pressure sensor 210 via the coupling member 240 to provide a desired or reference pressure or loading to the first pressure sensor 210. In other examples, the loading mechanism 224 may include a spring (FIG. 4), a dome, a dome and spring combination, and/or any other suitable loading mechanism to provide a reference or pre-set pressure or loading to the first fluid valve 208.

Figure 2B:
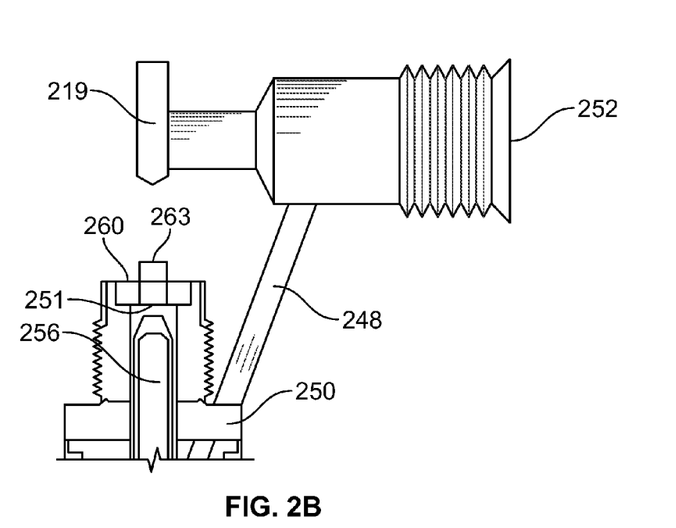
FIG. 2B is an enlarged cross-sectional view of the example fluid regulator of FIG. 2A.

The example regulator 200 also includes a second fluid valve 246 disposed within the regulator body 202. FIG. 2B illustrates a partial cross-sectional view of the example regulator 200 of FIG. 2A. Referring also to FIG. 2B, a passageway 248 fluidly couples the first fluid valve 208 to an intermediate chamber 250. In other words, an inlet 251 of the second fluid valve 246 may be fluidly coupled to the outlet 219 of the first fluid valve 208. The passageway 248 may include a port 252 (FIG. 2B) to receive a gauge (e.g., a pressure gauge, a flow rate gauge, etc.), a plug, etc.

In this example, the second fluid valve 246 includes a second pressure sensor 254 operatively coupled to a second flow control member 256 (e.g., a poppet or a valve plug). The second flow control member 256 is coupled to the second pressure sensor 254 via a spring 257 and is at least partially disposed within a cavity 258 of the second pressure sensor 254. The spring 257 provides precise control of the second flow control member 254 and/or prevents the second flow control member 256 from forcibly engaging a valve seat 260. In this example, the second pressure sensor 254 includes a passage 259 so that the second flow control member 256 is pressure balanced. However, in other examples, the second flow control member 256 may be unbalanced. The valve seat 260 is coupled to the regulator body 202 via a retainer 262 and defines the inlet 251 and an outlet 263 of the second fluid valve 246.

Additionally, the regulator 200 includes a plug 264 that is coupled (e.g., threadably coupled) to the regulator body 202. The plug 264 and the regulator body 202 define a loading chamber 266. The loading chamber 266 is fluidly coupled (e.g., directly coupled) to the inlet 204 via a pressure sensing path or passage 268. In this example, the pressure sensing passage 268 is integrally formed with the regulator body 202. However, in other examples, the pressure sensing path 268 may be a hose, tubing (e.g., located internally or externally of the regulator body 202), etc. In other words, the second fluid valve 246 is directly coupled to the inlet 204. In this manner, a first side 270 of the second pressure sensor 254 is dome-loaded by the pressure of the pressurized fluid at the inlet 204. More specifically, the first side 270 of the second pressure sensor 254 is in fluid communication with the inlet 204 or loading chamber 266 and a second side 272 of the second pressure sensor 254 is in fluid communication with the passageway 248 or the intermediate chamber 250. In this manner, as described in greater detail below, the second fluid valve 246 causes the fluid pressure in the passageway 248 or the intermediate chamber 250 to be regulated to a predetermined portion or fraction of the pressure of the pressurized fluid at the inlet 204.

In this example, the second pressure sensor 254 comprises a piston 273 having a cylindrically-shaped body 274 and a stem portion 276 slidably coupled within a bore 278 of the plug 264. However, in other examples, the first and/or second pressure sensors 210 and 254 may include a diaphragm, bellows, and/or any other suitable pressure sensing mechanism (s). The piston 273 includes a sealing member 280 (e.g., an o-ring) and a back-up ring 281 to prevent fluid from passing between the loading chamber 266 and the intermediate chamber 250. Additionally, the plug 264 includes a sealing member 282 to prevent leakage between loading chamber 266 and the regulator body 202. A second plug 284 is threadably coupled to the stem 276 to retain the spring 257 within the cavity 258 of the second pressure sensor 254. The second plug 284 includes a sealing member 285 (e.g., an o-ring) and a back-up ring 286 to prevent fluid in the loading chamber 266 from venting through a vent 288 of the plug 264.

In operation, the inlet 204 is in fluid communication with, for example, a pressure source providing a relatively high pressure fluid (e.g., hydraulic fluid). The outlet 206 is in fluid communication with, for example, a low pressure device or system or the atmosphere. The regulator 200 regulates the pressure of the pressurized fluid at the inlet 204 to provide or control a desired pressure to a process system by relieving or reducing excess pressure when the pressure of the pressurized fluid at the inlet 204 exceeds the reference pressure defined by the loading mechanism 224.

To achieve a desired reference pressure, the first chamber 232 of the actuator 225 is provided with a control fluid (via the port 244) to bias the actuator stem 236 toward the first pressure sensor 210. The actuator stem 236 exerts a force on a second side 237 of the first pressure sensor 210 to bias the first flow control member 212 toward the valve seat 216 to restrict the flow of the pressurized fluid between the inlet 204 and the passageway 248 or the intermediate chamber 250 (e.g., the outlet 219 of the first fluid valve 208). Thus, the reference pressure is adjusted based on the amount of force that is to be exerted by the diaphragm 226 on the first pressure sensor 210. The desired reference pressure or set-point may be configured by adjusting the pressure and, thus, the force exerted on the first side 231 of the diaphragm 226 via the control fluid (i.e., increasing or decreasing the pressure of the control fluid supplied to the first chamber 232).

With the reference pressure set, the sensing chamber 222 senses a pressure of the pressurized fluid at the inlet 204 via the inlet path 223. When the pressure of the pressurized fluid in the sensing chamber 222 is less than the reference pressure provided by the loading mechanism 224, the first pressure sensor 210 (e.g., via the actuator stem) causes the first flow control member 212 to move toward the valve seat 216 (e.g., to engage the valve seat 216) to prevent fluid flow between the inlet 204 and the intermediate chamber 250. The spring 213 prevents the first flow control member 212 from forcibly engaging the valve seat 216 when the chamber 232 of the actuator 225 receives the control fluid to bias the first pressure sensor 210, thereby preventing damage to the first flow control member 212 and/or the valve seat 216. Conversely, when a pressure of the pressurized fluid at the inlet 204 exceeds the reference pressure provided by the actuator 225, the first pressure sensor 210 causes the first flow control member 212 to move to an open position to allow fluid flow between the inlet 204 and the intermediate chamber 250 (e.g., between the outlet 219 of the first fluid valve 208 and the inlet 251 of the second fluid valve 246). In other words, the first pressure sensor 210 causes the first flow control member 212 to move toward the diaphragm 226 (e.g., an upward direction in the orientation of FIG. 2A) when the force exerted on the first side 220 of the first pressure sensor 210 by the pressurized fluid in the sensing chamber 222 exceeds the force exerted on the second side 237 of the first pressure sensor 210 by the loading mechanism 224.

When the first pressure sensor 210 moves toward the diaphragm 226, the first flow control member 212 moves away from the valve seat 216 to allow fluid flow between the inlet 204 and the intermediate chamber 250 (e.g., an open position). The fluid flow rate of the pressurized fluid then increases between the inlet 204 and the passageway 248 or intermediate chamber 250, which causes the pressure of the pressurized fluid at the inlet 204 to decrease when the pressure of the pressurized fluid at the inlet 204 exceeds the reference pressure provided by the loading mechanism 224.

As a result, the pressure of the fluid in the passageway 248 or the intermediate chamber 250 increases. In this example, the second pressure sensor 254 senses the increased pressure of the fluid in the passageway 248 or the intermediate chamber 250. Additionally, because the first side 270 of the second pressure sensor 254 is loaded (e.g., dome loaded) by the pressure of the pressurized fluid at the inlet 204, the second pressure sensor 254 senses a pressure differential between the pressure of the fluid in the passageway 248 or the intermediate chamber 250 and the pressure of the pressurized fluid at the inlet 204. Additionally or alternatively, the spring 257 prevents the second flow control member 256 from forcibly engaging the valve seat 260 when the pressure of the pressurized fluid in the loading chamber 266 is substantially greater than the pressure of the fluid in the intermediate chamber 250, thereby preventing damage to the second flow control member 256 and/or the valve seat 260.

In other words, the pressurized fluid at the inlet 204 exerts a force on the first side 270 of the second pressure sensor 254 via the loading chamber 266 and the fluid in the intermediate chamber 250 exerts a force on the second side 272 of the second pressure sensor 254. For example, a force exerted on the first side 270 by a pressure of the pressurized fluid at the inlet 204 and a force exerted on the second side 272 by a pressure of the fluid in the intermediate chamber 250 causes the second pressure sensor 254 to move the second flow control member 256 to an open position to allow fluid flow between the intermediate chamber 250 and the outlet 206 when the force exerted on the second side 272 by the pressure of the fluid in the intermediate chamber 250 is greater than the force exerted on the first side 270 by the pressure of the pressurized fluid at the inlet 204. In this example, the outlet 263 of the second fluid valve 246 is fluidly coupled to the outlet 206. As noted above, the outlet 206 is typically coupled to a low pressure system, or to the atmosphere.

The second pressure sensor 254 causes the second flow control member 256 to move to the open position until the fluid pressure in the passageway 248 or the intermediate chamber 250 is reduced or regulated to a predetermined portion or fraction of the pressured fluid at the inlet 204. The predetermined portion or fraction is provided by a predetermined loading ratio described in greater detail below in connection with FIGS. 3A and 3B.

When the pressure of the fluid in the passageway 248 or the intermediate chamber 250 is regulated to a pressure corresponding to the predetermined loading ratio, the second pressure sensor 254 causes the second flow control member 256 to move to the closed position, thereby trapping the regulated fluid within the intermediate chamber 250 or passageway 248 until the first fluid valve 208 and the second fluid valve 246 move to their open positions.

Thus, the second fluid valve 246 typically opens approximately when the first fluid valve 208 opens and the second fluid valve 246 typically closes approximately when the first fluid valve 208 closes. When the pressure of the pressurized fluid at the inlet 204 is substantially equal to, or less than, the reference pressure, the first fluid valve 208 remains closed. Additionally, the second fluid valve 246 also remains closed so long as the pressure of the fluid within the intermediate chamber 250 is substantially equal to or less than a pressure corresponding to a fraction of the pressurized fluid at the inlet 204 provided by the predetermined loading ratio.

Figure 3A:
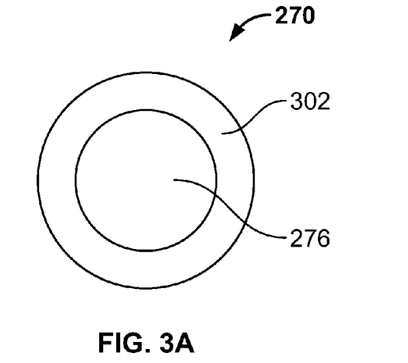
FIG. 3A is a cross-sectional view of a first side of a pressure sensor of the example fluid regulator of FIG. 2A.
Figure 3B:
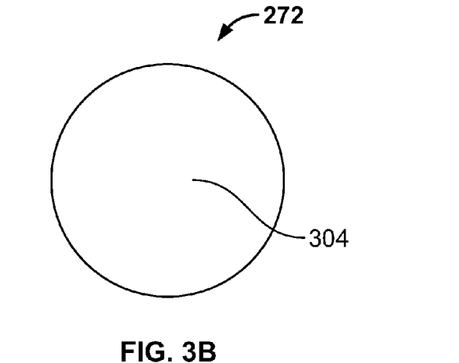
FIG. 3B is a cross-sectional view of a second side of the pressure sensor of the example fluid regulator of FIG. 2A.

FIG. 3A illustrates a cross-sectional view of the first side 270 of the second pressure sensor 254. FIG. 3B illustrates a cross-sectional view of the second side 272 of the second pressure sensor 254. The first side 270 of the second pressure sensor 254 has a first surface area 302 (FIG. 3A) and the second side 272 of the second pressure sensor 254 has a second surface area 304 (FIG. 3B). The first surface area 302 and the second surface area 304 provide or define a predetermined or fixed loading ratio so that the fluid pressure in the passageway 248 or the intermediate chamber 250 is reduced to a predetermined fraction of the pressure of the pressurized fluid at the inlet 204 corresponding to the predetermined loading ratio.

As noted above, in this example, the second surface area 304 of the second side 272 is larger than the first surface area 302 of the first side 270. In this example, the stem 276 of the second pressure sensor 254 reduces the overall first surface area 302 relative to the second surface area 304. Thus, the first surface area 302 is smaller than the second surface area 304. Because the second surface area 304 is larger than the first surface area 302, the second surface area 304 reduces the ratio of force-to-surface area compared to the force-to-surface area ratio of the first side 270 and, thus, results in a lower pressure of the fluid in the intermediate chamber 250 required to provide a balanced condition of the second fluid valve 246 (e.g., a closed position) relative to the pressure of the pressurized fluid at the inlet 204 exerted on the first surface area 302.

As a result, the first and second surface areas 302 and 304 provide a predetermined loading ratio that is to regulate the fluid pressure in the passageway 248 or the intermediate chamber 250 to a portion or fraction of the pressurized fluid at the inlet 204. For example, the first surface area 302 may be about half the second surface area 304 to cause the second fluid valve 246 to regulate the fluid pressure in the passageway 248 or the intermediate chamber 250 to approximately fifty percent (50%) of the pressure of the pressurized fluid at the inlet 204. In other examples, the predetermined ratio may be any other desired value. For example, if the second surface area 304 is configured to be three times the first surface area 302, a second fluid valve will provide a predetermined loading ratio to regulate the pressure of the fluid in the passageway 248 to one-third (⅓) of the pressure of the pressurized fluid at the inlet 204.

Figure 4:
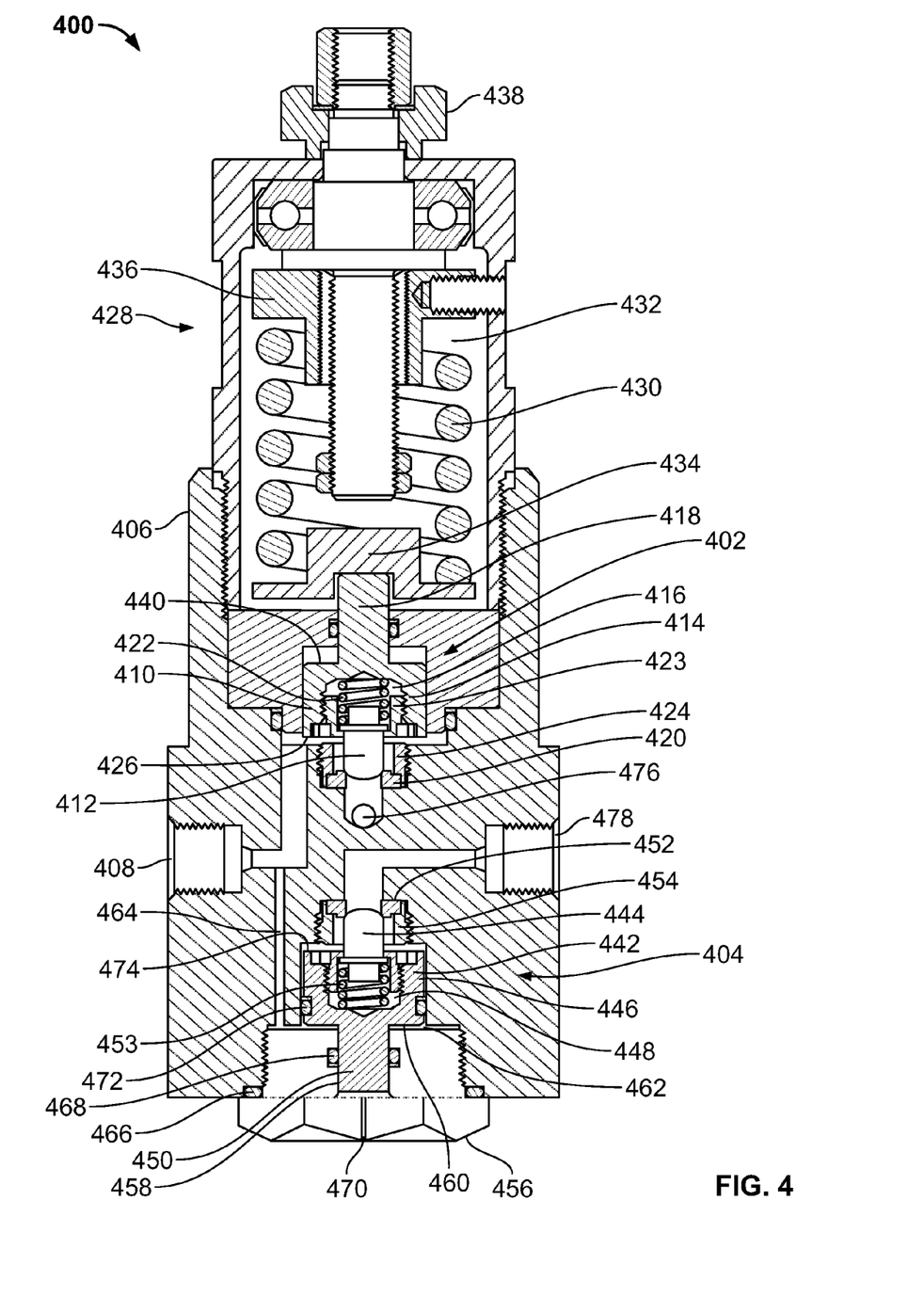
FIG. 4 illustrates another example fluid regulator described herein.

FIG. 4 illustrates yet another example fluid regulator 400. Similar to the example regulator 200 of FIGS. 2A and 2B, the example fluid regulator 400 includes a first fluid valve 402 and a second fluid valve 404 disposed within a regulator body 406 to reduce the pressure of a fluid flowing through the regulator 400 in a series of stages. Those components of the example regulator 400 that are substantially similar or identical to the components of the example regulator 200 described above and that have functions substantially similar or identical to the functions of those components will not be described in detail again below. Instead, the interested reader is referred to the above corresponding descriptions in connection with FIGS. 2A, 2B, 3A, and 3B.

The first fluid valve 402 regulates the pressure of a pressurized fluid at an inlet 408. In this example, the first fluid valve 402 includes a first pressure sensor 410 operatively coupled to a first flow control member 412. In this example, the first pressure sensor 410 comprises a piston slidably coupled within the regulator body 406. The piston includes a cylindrically-shaped body 414 having a cavity 416 and a stem portion 418. The first flow control member 412 is at least partially disposed within the cavity 416 and is biased toward a valve seat 420 via a biasing element 422 (e.g., a spring). Additionally, in this example, the first flow control member 412 is threadably retained to the first pressure sensor 410 via a retainer 423. The valve seat 420 is coupled to the regulator body 406 via a retainer 424.

The inlet 408 is fluidly coupled to a first side 426 of the first pressure sensor 410. The first pressure sensor 410 causes the first flow control member 412 to move away from the valve seat 420 to allow fluid flow through the first fluid valve 402 when the pressure of the pressurized fluid at the inlet 408 exceeds a reference pressure.

Similar to the regulator 200, the pre-set or reference pressure is determined by a loading mechanism 428. In this example, the loading mechanism 428 includes a spring 430 disposed within a chamber 432 of the regulator body 406 between a fixed spring seat 434 and an adjustable second spring seat 436. A control knob 438 adjusts (e.g., increases or decreases) the force exerted by the spring 430 on a second side 440 of the first fluid valve 402 via the first spring seat 434. In other examples, the loading mechanism 428 may be an actuator (e.g., pneumatic actuator), a dome-loaded mechanism, a combined spring and dome-loaded mechanism, or any other suitable loading mechanism(s) to provide a desired reference pressure or loading.

The second fluid valve 404 regulates the pressure of a fluid flowing from the first fluid valve 402 to a predetermined portion of the pressure of the pressurized fluid at the inlet 408 in a manner substantially similar to the example regulator 200 described above. The second fluid valve 404 includes a second pressure sensor 442 operatively coupled to a second flow control member 444. In this example, the second pressure sensor 442 comprises a piston slidably coupled within the regulator body 406. The piston has a cylindrically-shaped body 446 having a cavity 448 and a stem portion 450. The second flow control member 444 is at least partially disposed within the cavity 448 of the second pressure sensor 442 and is biased toward a valve seat 452 via a biasing element 453 (e.g., a spring). Additionally, in this example, the second flow control member 444 is threadably coupled to the second pressure sensor 442 via a retainer 453. The valve seat 452 is coupled to the regulator body 406 via a retainer 454.

Additionally, the regulator 400 includes a plug 456 coupled (e.g., threadably coupled) to the regulator body 406 and includes a bore 458 to slidably receive the stem portion 450 of the second pressure regulator 442. The plug 456, the regulator body 406, and a first side 460 of the second pressure sensor 442 define a loading chamber 462. A pressure sensing path or passage 464 integrally formed with the regulator body 406 fluidly couples the inlet 408 to the loading chamber 462. In this manner, the second fluid valve 404 is dome-loaded by the pressure of the pressurized fluid at the inlet 408. The plug 456 includes a sealing member 466 (e.g., an o-ring) to seal the loading chamber 462. A sealing member 468 is disposed between the stem portion 450 and the bore 458 of the plug 456 to seal the loading chamber 462 from a vent 470 of the plug 456. Additionally, the second pressure sensor 442 includes a sealing member 472 to seal the first side 460 of the second pressure sensor 442 from a second side 474 of the second pressure sensor 442.

The second side 474 has a first surface area that is greater than a second surface area of the first side 460 of the second pressure sensor 446. In this manner, the second pressure sensor 446 causes the second flow control member 444 to move to the open position until the fluid pressure in a passageway 476 between the first and second fluid valves 402 and 404 is reduced or regulated to a predetermined portion or fraction of the pressured fluid at the inlet 408. The predetermined portion or fraction is provided by a predetermined loading ratio is substantially similar to predetermined portion provided by the regulator 200 as described above in connection with FIGS. 3A and 3B.

Thus, the example regulator 400 reduces a pressure differential across the regulator 400 between the regulator inlet 408 and a regulator outlet 478 in multiple stages. The first fluid valve 402 provides a first stage reduction of pressure (e.g., a first pressure reduction between the pressure of the pressurized fluid at the inlet 408 and the pressure of the fluid in the passageway 476) and the second fluid valve 404 provides a second stage reduction of pressure (e.g., a second pressure reduction between the pressure of the fluid in the passageway 476 and the outlet 478). The second stage reduction provides a fluid having a pressure that is a fraction of the pressure of the pressurized fluid at the inlet 408, wherein the fraction corresponds to or is based on a first surface area of the first side 460 of the second pressure sensor 446 and a second surface area of the second side 474 of the second pressure sensor 446. In this manner, the first fluid valve 402 and the second fluid valve 404 are only subjected to a portion of a total pressure differential across the regulator 400 between the inlet 408 and the outlet 478. As a result, the first and second fluid valves 402 and 404 are exposed to smaller or lower pressure differentials and thus, smaller or lower fluid flow rates, thereby substantially minimizing or preventing damage to the components of the first or second fluid valves 402 and 404. Therefore, the useful life of the example regulator 400 is significantly extended, requiring less maintenance, system downtimes, inventories and, thus, costs.

Although certain apparatus, methods, and articles of manufacture have been described herein, the scope of coverage of this patent is not limited thereto. To the contrary, this patent covers all embodiments fairly falling within the scope of the appended claims either literally or under the doctrine of equivalents.

What is claimed is:

1. A fluid regulator comprising:
a regulator body having an inlet in fluid communication with a source of pressurized fluid;
a first fluid valve disposed within the regulator body and coupled to the inlet to regulate a pressure of the pressurized fluid at the inlet; and
a second fluid valve disposed within the regulator body and coupled to the inlet and, via a passageway, to the first fluid valve, the second fluid valve is to cause a fluid pressure in the passageway to be regulated to a predetermined portion of the pressure of the pressurized fluid at the inlet, the second fluid valve configured to provide a predetermined loading ratio so that the fluid pressure in the passageway is a predetermined fraction of the pressure of the pressurized fluid at the inlet.

2. A fluid regulator comprising
a regulator body having an inlet in fluid communication with a source of pressurized fluid;
a first fluid valve disposed within the regulator body and coupled to the inlet to regulate a pressure of the pressurized fluid at the inlet; and
a second fluid valve disposed within the regulator body and coupled to the inlet and, via a passageway, to the first fluid valve, the second fluid valve is to cause a fluid pressure in the passageway to be regulated to a predetermined portion of the pressure of the pressurized fluid at the inlet, wherein a first side of the second fluid valve is in fluid communication with the fluid in the passageway and a second side of the second fluid valve is in fluid communication with the pressurized fluid at the inlet, wherein a first surface area of the first side of the second fluid valve is larger than a second surface area of the second side of the second fluid valve.

3. A fluid regulator of claim 2, wherein the second side of the second fluid valve is dome loaded by the pressure of the pressurized fluid at the inlet.

4. A fluid regulator of claim 2, wherein the inlet is directly coupled to the second fluid valve.

5. A fluid regulator comprising:
a regulator body having an inlet in fluid communication with a source of pressurized fluid;
a first fluid valve disposed within the regulator body and coupled to the inlet to regulate a pressure of the pressurized fluid at the inlet; and
a second fluid valve disposed within the regulator body and coupled to the inlet and, via a passageway, to the first fluid valve, the second fluid valve is to cause a fluid pressure in the passageway to be regulated to a predetermined portion of the pressure of the pressurized fluid at the inlet, wherein a first side of the second fluid valve is in fluid communication with the fluid in the passageway and a second side of the second fluid valve is in fluid communication with the pressurized fluid at the inlet, the first and second surface areas to provide a loading ratio that is to regulate the fluid pressure in the passageway to about fifty percent of the pressure of the pressurized fluid at the inlet.

6. A fluid regulator comprising:
a regulator body having an inlet in fluid communication with a source of pressurized fluid;
a first fluid valve disposed within the regulator body and coupled to the inlet to regulate a pressure of the pressurized fluid at the inlet; and
a second fluid valve disposed within the regulator body and coupled to the inlet and, via a passageway, to the first fluid valve, the second fluid valve is to cause a fluid pressure in the passageway to be regulated to a predetermined portion of the pressure of the pressurized fluid at the inlet, a first side of the second fluid valve being in fluid communication with the fluid in the passageway and a second side of the second fluid valve being in fluid communication with the pressurized fluid at the inlet, the second side of the second fluid valve is dome loaded by the pressure of the pressurized fluid at the inlet, and each of the first and second fluid valves includes a respective piston operatively coupled to a respective flow control member, wherein each of the pistons slides within the regulator body to cause each of the flow control members to move between an open position and a closed position relative to respective valve seats coupled to the regulator body.

7. A fluid regulator of claim 6, wherein each of the respective flow control members is coupled to its respective piston.

8. A fluid regulator of claim 7, wherein at least a portion of each of the respective flow control members is disposed within a cavity of its respective piston.

9. A fluid regulator of claim 8, wherein each of the flow control members is threadably coupled to its respective piston via a retainer.

10. A fluid regulator of claim 6, wherein at least one of the first or second flow control members is pressure balanced.

11. A fluid regulator of claim 6, further comprising a plug coupled to the regulator body and having a bore to slidably receive a stem of the piston of the second fluid valve.

12. A fluid regulator comprising:
a regulator body having a first inlet to be in fluid communication with a source of pressurized fluid;
a first fluid valve disposed in the regulator body and having a second inlet and a first outlet, the second inlet fluidly coupled to the first inlet, the first valve to increase a flow of the pressurized fluid from the second inlet to the first outlet to decrease a pressure of the pressurized fluid when the pressure of the pressurized fluid at the inlet exceeds a pre-set pressure;

a second fluid valve disposed in the regulator body and having a third inlet and a second outlet, the third inlet coupled to the first outlet, the second valve fluidly coupled to the first inlet to cause the second valve to regulate a fluid pressure at the first outlet and the third inlet based on the pressure of the pressurized fluid at the first inlet; and a sensing chamber fluidly coupled to the first inlet of the regulator body and the second inlet of the first fluid valve, and an intermediate chamber fluidly coupled to the first outlet of the first fluid valve and the third inlet of the second fluid valve, the second fluid valve having a second flow control member operatively coupled to a second sensor, the second sensor to cause the second flow control member to move to an open position to regulate the pressure of the fluid in the intermediate chamber to a pressure based on a predetermined fraction of the pressure of the pressurized fluid at the first inlet.

13. A fluid regulator of claim 12, wherein the first fluid valve comprises a first flow control member operatively coupled to a first sensor, wherein the first sensor is to sense the pressure of the pressurized fluid in the sensing chamber and is to cause the first flow control member to move to an open position to allow fluid flow between the first inlet and the intermediate chamber when the pressurized fluid at the inlet exceeds the pre-set pressure.

14. A fluid regulator of claim 12, wherein the second sensor comprises a first side having a first area in fluid communication with the fluid in the intermediate chamber and a second side having a second area in fluid communication with the pressurized fluid at the inlet.

15. A fluid regulator of claim 14, wherein the predetermined fraction of the pressurized fluid at the inlet corresponds to a predetermined loading ratio provided by the first area and the second area.

16. A fluid regulator of claim 15, further comprising a loading chamber between the first inlet and the second side of the second sensor.

17. A fluid regulator of claim 16, wherein the second side of the second sensor is directly coupled to the first inlet.

18. A fluid regulator of claim 12, wherein the second sensor comprises a piston.

19. A fluid regulator of claim 12, further comprising a loading element operatively coupled to the first fluid valve to provide the pre-set pressure.

20. A fluid regulator of claim 19, wherein the loading element comprises a spring or a pneumatic actuator.

21. A fluid regulator of claim 12, wherein the second outlet of the second fluid valve is to be fluidly coupled to a low pressure system.

22. A fluid regulator comprising:

first means for regulating a pressure of a pressurized fluid at an inlet of the regulator, the first means for regulating to cause fluid flow through a first passageway of the regulator when the pressure of the pressurized fluid at the inlet exceeds a pre-set pressure; and second means for regulating the pressure of fluid flow through a second passageway between the first means for regulating and an outlet of the regulator, the second means for regulating to regulate the pressure of the fluid in the second passageway to a predetermined portion of the pressurized fluid at the inlet, wherein the predetermined portion of the pressurized fluid at the inlet is based on a predetermined loading ratio provided by the second means for regulating.

23. A fluid regulator of claim 22, wherein the fluid flowing in the second passageway is in fluid communication with a first side of the second means for regulating and the pressurized fluid at the inlet is in fluid communication with a second side of the second means for regulating.

24. A fluid regulator of claim 23, wherein the predetermined loading ratio corresponds to a ratio provided by the first area of a first side of the second means for regulating and a second area of a second side of the second means for regulating.

25. A fluid regulator of claim 22, wherein the second means for regulating comprises a piston having a cylindrical body operatively coupled to a flow control member.

* * * * *